(12) United States Patent
Kobayashi et al.

(10) Patent No.: US 7,641,948 B2
(45) Date of Patent: Jan. 5, 2010

(54) IN-MOLD TRANSFER FILM

(75) Inventors: Hiroshi Kobayashi, Fukushima-ken (JP); Mitsuo Hirano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/936,974

(22) Filed: Nov. 8, 2007

(65) Prior Publication Data
US 2008/0118715 A1 May 22, 2008

(30) Foreign Application Priority Data
Nov. 17, 2006 (JP) .............................. 2006-311663

(51) Int. Cl.
*B41M 5/40* (2006.01)
(52) U.S. Cl. ................. 428/32.62; 428/32.75; 428/32.8; 428/32.87
(58) Field of Classification Search ............. 428/32.62, 428/32.75, 32.8, 32.87
See application file for complete search history.

(56) References Cited
U.S. PATENT DOCUMENTS

| 5,284,693 A | 2/1994 | Spain et al. |
| 5,506,031 A | 4/1996 | Spain et al. |
| 5,662,977 A | 9/1997 | Spain et al. |
| 5,795,527 A | 8/1998 | Nakamura et al. |
| 5,935,692 A | 8/1999 | Smith |
| 2005/0163940 A1* | 7/2005 | Liang et al. ............ 428/1.1 |

FOREIGN PATENT DOCUMENTS

| JP | 2003-127596 | 5/2003 |
| WO | 91/05660 A1 | 5/1991 |
| WO | 01/26874 A1 | 4/2001 |

OTHER PUBLICATIONS

European Search Report issued in corresponding European Patent Application No. 07 02 0883; dated Jan. 22, 2009.

* cited by examiner

*Primary Examiner*—Betelhem Shewareged
(74) *Attorney, Agent, or Firm*—Brinks Hofer Gilson & Lione

(57) ABSTRACT

An in-mold transfer film is formed to satisfy the conditions of F2>F1, F3>F2, F3>F1, and F3>F1+F4+F5, where F1 is an adhesive force at an interface between a base and a mold-release layer, F2 is an adhesive force at an interface between the mold-release layer and a printed ink layer, F3 is an adhesive force at an interface between the printed ink layer and a transferred object, F4 is a cohesive force of the mold-release layer, and F5 is a cohesive force of the printed ink layer.

4 Claims, 1 Drawing Sheet

IN-MOLD TRANSFER FILM

CLAIM OF PRIORITY

This application claims benefit of the Japanese Patent Application No. 2006-311663 filed on Nov. 17, 2006, which is hereby incorporated by reference.

BACKGROUND OF THE INVENTION

1. Field of the Invention

The present invention relates to in-mold transfer films, and more particularly to an in-mold transfer film suitable for multi-kind and small-quantity production.

2. Description of the Related Art

In known in-mold decorating, a printed in-mold transfer film (sheet) is arranged in a mold used for injection molding, so that a molded part as a transferred object is formed by injection molding, and at the same time, various images such as patterns or characters are transferred on a surface of the molded part in the mold.

Japanese Unexamined Patent Application Publication No. 2003-127596 (FIG. 1) suggests an example in-mold transfer film used in such in-mold decorating. This in-mold transfer film has a mold-release layer on a surface of a base, and a printed ink layer provided on a surface of the mold-release layer by thermally transferring ink using a thermal transfer printer. Such formation of the printed ink layer is suitable for multi-kind and small-quantity production as compared with formation of a printed ink layer by a printing method, such as gravure printing, screen printing, or offset printing, or by depositing, with the use of a plate FIG. 2 is an explanatory illustration showing procedures in sequence of in-mold decorating. As shown in part (a) of FIG. 2, a pair of molds 101A and 101B are opened, and an in-mold transfer film 102 is set at a predetermined position inside a mold 101 (the reference numeral 101 denotes a combination of the pair of molds 101A and 101B). At this time, the in-mold transfer film 102 is arranged such that a printed ink layer 102b provided on a base 102 faces a material to be injected to a cavity 101c (see part (b) of FIG. 2).

As shown in part (b) of FIG. 2, the mold 101 is clamped so that the mold 101 is closed. At this time, a predetermined portion of the in-mold transfer film 102 is sandwiched in the mold 101.

As shown in part (c) of FIG. 2, a material 103 is injected to the cavity 101c of the closed mold 101. The material 103 injected to the mold 101 is cooled and solidified to provide a molded part 104 as a transferred object. At this time, the material injected to the cavity 101c is injected to cover the printed ink layer 102b of the in-mold transfer film 102 arranged at the cavity 101c. The printed ink layer 102b contacting the material is bonded (thermally transferred) to a surface of the molded part 104 by heat and pressure (injection pressure) of the material.

As shown in part (d) of FIG. 2, the mold 101 is opened, and the molded part 104 is released from the cavity 101c of the mold 101. At this time, the portion of the printed ink layer 102b bonded to the molded part 104 is released from the base 102a of the in-mold transfer film 102.

As described above, in in-mold decorating, printing (decorating) is performed by transferring the printed ink layer 102a as an image applied to the molded part 104 during molding.

Meanwhile, in recent years, mold techniques and computer designs are becoming highly efficient. In the in-mold transfer film 102, the printed ink layer 102b as the image to be transferred to the transferred object 104 is also desired to be improved in shape followingness and graphical design.

SUMMARY

Thus, according to an aspect of the present disclosure, an in-mold transfer film includes a film-like base, a mold-release layer provided on a surface of the base, and a printed ink layer provided on a surface of the mold-release layer by thermally transferring ink using a thermal transfer printer. In in-mold decorating, a molded part as a transferred object is formed, and at the same time, the printed ink layer is printed on a surface of the molded part. Also, the conditions of $F2>F1$, $F3>F2$, $F3>F1$, and $F3>F1+F4+F5$ are satisfied, where $F1$ is an adhesive force at an interface between the base and the mold-release layer, $F2$ is an adhesive force at an interface between the mold-release layer and the printed ink layer, $F3$ is an adhesive force at an interface between the printed ink layer and the transferred object, $F4$ is a cohesive force of the mold-release layer, and $F5$ is a cohesive force of the printed ink layer. With this configuration, release at the interface between the base and the mold-release layer can be easily and reliably performed by in-mold decorating. As a result, a high-efficient configuration can be easily provided by improving a transferring property of the printed ink layer to be transferred on the molded part.

Preferably, in the above in-mold transfer film, the printed ink layer may at least partially contain a multilayer portion, and an adhesive force at an interface between every two adjacent printed ink layers may be greater than $F1$. With this configuration, the release can be easily and reliably performed at the interface between the base and the mold-release layer by in-mold decorating even in a case where various types of printing, such as full-color printing, and multi-color printing, are performed on the surface of the transferred object.

Preferably, in the above in-mold transfer film, $F1$ may range from about 0.02 to about 0.3 (mN/cm), and the mold-release layer and the printed ink layer may have glass transition temperatures ranging from about 50° C. to about 150° C. With this configuration, the release can be easily and reliably performed at the interface between the base and the mold-release layer by in-mold decorating.

With the in-mold transfer film according to the aspect of the present invention, since the release can be easily and reliably performed at the interface between the base and the mold-release layer by in-mold decorating, an excellent advantage such as that the highly efficient configuration can be easily provided by improving shape followingness and graphical design of the printed ink layer as the image to be transferred on the molded part.

DESCRIPTION OF THE EMBODIMENTS

Figure 1:
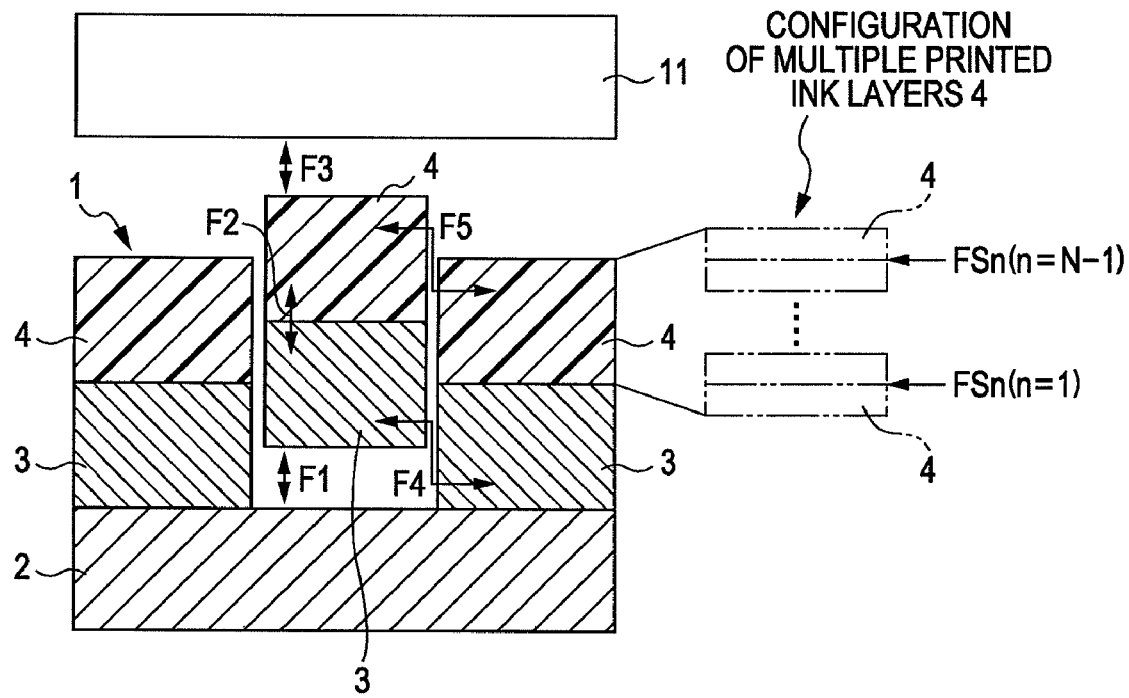
FIG. 1 is a cross-sectional view schematically showing an in-mold transfer film according to an embodiment of the present disclosure.
Figure 2:
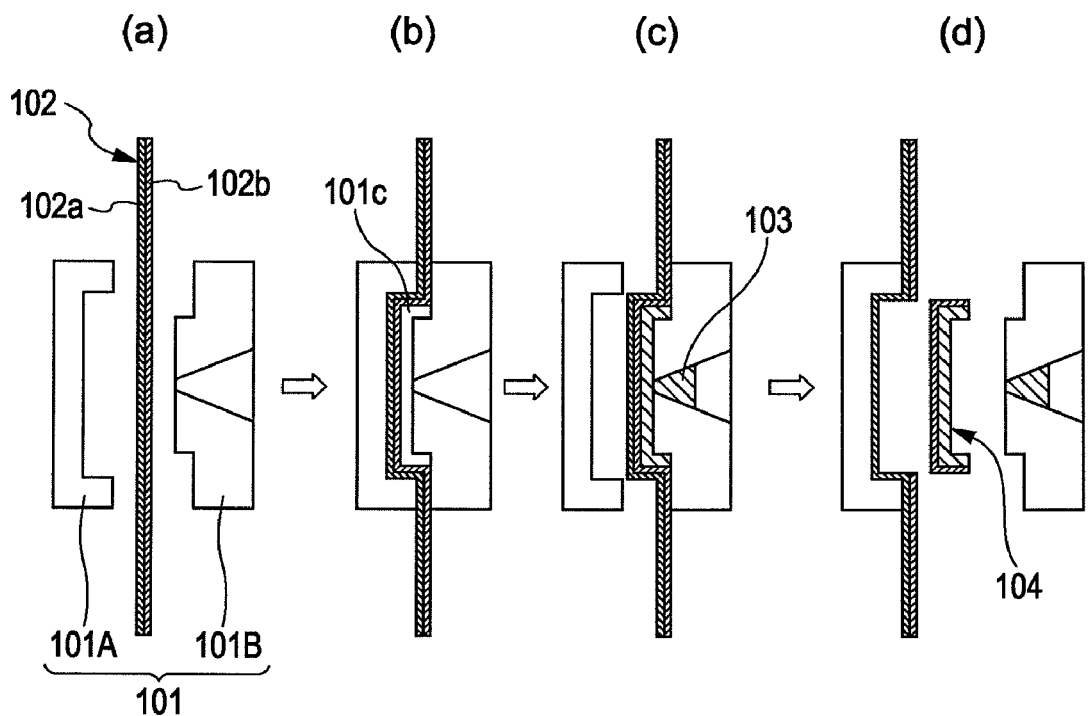
FIG. 2 is an explanatory illustration showing procedures in sequence of in-mold decorating.

An embodiment of the present disclosure shown in the drawings is described below.

FIG. 1 is a cross-sectional view schematically showing an in-mold transfer film according to an embodiment of the present disclosure.

As shown in FIG. 1, an in-mold transfer film 1 of this embodiment has a film (sheet) base 2 of a predetermined size, a mold-release layer 3 formed on an upper surface of the base 2, and a printed ink layer 4 formed on an upper surface of the mold-release layer 3. The printed ink layer 4 is transferred on a surface of a molded part 11 as a transferred object by in-mold decorating. The in-mold transfer film 1 of this embodiment is released at an interface between the base 2 and the mold-release layer 3 by in-mold decorating, and both the printed ink layer 4 and the mold-release layer 3 are transferred (thermally transferred) on the molded part 11 as the transferred object.

The printed ink layer 4 may employ a monolayer configuration or a multilayer configuration as indicated by two-dotted lines of FIG. 1. The monolayer configuration or the multilayer configuration of the printed ink layer 4 may be determined depending on the desired pattern, color, or both, of an image to be transferred on the molded part 11.

The in-mold transfer film 1 of this embodiment is formed to satisfy the conditions of $F2>F1$, $F3>F2$, $F3>F1$, $F3>F1+F4+F5$, where $F1$ is an adhesive force at an interface between the base 2 and the mold-release layer 3, $F2$ is an adhesive force at an interface between the mold-release layer 3 and the printed ink layer 4, $F3$ is an adhesive force at an interface between the printed ink layer 4 and the transferred object, $F4$ is a cohesive force of the mold-release layer 3, and $F5$ is a cohesive force of the printed ink layer 4. Note that, all of the conditions of $F2>F1$, $F3>F2$, $F3>F1$, $F3>F1+F4+F5$ are satisfied.

$F1$ preferably ranges from about 0.02 to about 0.3 (mN/cm), and more preferably ranges from about 0.05 to about 0.1 (mN/cm). If $F1$ is above the range, when the molded part 11 is removed from a mold, for instance, a failure of the base 2 or a cohesive failure of ink may occur, resulting in a transfer failure. If $F1$ is below the range, powder fall in which the printed ink layer 4 falls from the base 2 may occur, or the printed ink layer 4 may not be laminated on the base 2.

When the multiple printed ink layers 4 are provided, it is important that an adhesive force at an interface between every two adjacent printed ink layers 4 is greater than $F1$ so that the release can be easily performed at the interface between the base 2 and the mold-release layer 3 by in-mold decorating even in a case where various types of printing, such as full-color printing, and multi-color printing, are performed on the transferred object.

In particular, as indicated by two-dotted lines of FIG. 1, when the multiple printed ink layers 4 are provided, it is important that the multiple printed ink layers 4 are formed to satisfy the condition of $FSn>F1$, where N (herein, N is an integer no less than 1) is the total number of the printed ink layers 4, and $FSn$ (herein, n is an integer no less than 1, the maximum value of n is N−1, and n at an interface adjacent to the mold-release layer 3 is 1) is an adhesive force at an interface between adjacent printed ink layers 4.

Note that units for $F1$ to $F5$ and $FSn$ usually employ mN/cm.

The mold-release layer 3 and the printed ink layer 4 preferably have glass transition temperatures ranging from about 50° C. to about 150° C., and more preferably have glass transition temperatures ranging from about 60° C. to about 90° C. If the glass transition temperatures are above the range, adhesion to the molded part 11 may be insufficient. If the temperatures are below the range, an image may be deformed or ink may flow depending on a material for the molded part 11 injected to a cavity of the mold. Hence, the mold-release layer 3 and the printed ink layer 4 preferably have thermoplastic properties, and glass transition temperatures ranging from about 50° C. to about 150° C.

The base 2 may be of any material as long as the base 2 can support the mold-release layer 3 and has a heat-resisting property and a mechanical characteristic (force) fitting for molding. The base 2 may be typically a polyester film, a polyimide film, or a polyethylene film.

The thickness of the base 2 may be appropriately determined in accordance with the material to be used so that the heat-resisting property, the mechanical characteristic, and the like, can fit for in-mold decorating. The thickness of the base 2 may preferably be about 2 μm or more, and more preferably, the thickness of the base 2 may range from about 2 to about 100 μm.

The mold-release layer 3 is preferably formed by thermally transferring ink for mold-release layer in the form of an ink ribbon by using a thermal transfer printer, because such a configuration is suitable for multi-kind and small-quantity production.

The ink for mold-release layer to form the mold-release layer 3 may be thermoplastic resin containing at least one of polyester resin, acrylic resin, polyurethane resin, polyethylene resin, polyvinyl chloride acetate copolymer resin, polyamide resin, and the like.

The thickness of the mold-release layer 3 may preferably range from about 0.5 to about 5.0 μm, and more preferably range from about 1.0 to about 3.0 μm. If the thickness of the mold-release layer 3 is above the range, a flash may be generated, that is, ink of the printed ink layer which is transferred with the mold-release layer 3 protrudes from an edge of the molded part 11. If the thickness of the mold-release layer 3 is below the range, the mold-release layer 3 may not be released from the base 2.

The printed ink layer 4 is preferably formed by thermally transferring ink for printed ink layer in the form of an ink ribbon by using a thermal transfer printer, because such a configuration is suitable for multi-kind and small-quantity production.

To provide the multiple printed ink layers 4, a first printed ink layer 4 is formed on a surface of the mold-release layer 3 using first ink, a second printed ink layer 4 is formed on a surface of the first printed ink layer 4 using second ink, and the similar procedure is repeated by the required number of layers, thereby providing the multiple printed ink layers 4.

The ink for ink layer for forming the printed ink layer 4 may be thermoplastic resin containing at least one of acrylic resin, polyvinyl chloride acetate copolymer resin, ethylene vinyl acetate copolymer resin, polyester resin, and the like. To such thermoplastic resin, natural wax, such as carnauba wax, candelilla wax, montan wax, or ceresine wax; or petroleum wax, such as paraffin wax, or microcrystalline wax, can be added, as required in accordance with the design concept. The thermoplastic resin made in this manner serves as a binder, and coloring agents of cyan (C), magenta (M), yellow (Y), and the like, are mixed to the binder.

For example, the coloring agent for yellow may use Disazo Yellow HR, Naphthol Yellow S, Hansa Yellow 5G, Hansa Yellow 3G, Hansa Yellow G, Hansa Yellow GR, Hansa Yellow A, Hansa Yellow RN, Hansa Yellow R, or Benzidine Yellow.

For example, the coloring agent for cyan may use Victoria Blue Lake, Metal-free Phthalocyanine Blue, Phthalocyanine Blue, or Fast Sky Blue.

The mold-release layer 3 and the printed ink layer 4 preferably have glass transition temperatures ranging from about 50° C. to about 150° C., and more preferably have glass transition temperatures ranging from about 60° C. to about 90° C. If the glass transition temperatures are above the range, adhesion to the molded part 11 may be insufficient. If the temperatures are below the range, an image may be deformed or ink may flow depending on a material for the molded part 11 injected to a cavity of the mold.

By combining and laminating the printed ink layers 4 for the three colors of cyan (C), magenta (M), and yellow (Y), a color image can be obtained. Also, printed ink layers 4 for black (BK), transparent colors, various metallic colors may be used, as required in accordance with the design concept.

The material of the molded part 11 as the transferred object may be any as long as the material can be injected to the cavity of the mold. For example, the material may be a kind of resin, ceramic, or rubber.

Next, the advantage of this embodiment having the above configuration is described.

The in-mold transfer film 1 of this embodiment is formed to satisfy the conditions of F2>F1, F3>F2, F3>F1, F3>F1+F4+F5, where F1 is the adhesive force at the interface between the base 2 and the mold-release layer 3, F2 is the adhesive force at the interface between the mold-release layer 3 and the printed ink layer 4, F3 is the adhesive force at the interface between the printed ink layer 4 and the transferred object, F4 is the cohesive force of the mold-release layer 3, and F5 is the cohesive force of the printed ink layer 4. Accordingly, the release can be reliably and easily performed at the interface between the base 2 and the mold-release layer 3 by in-mold decorating.

That is, by in-mold decorating, the mold-release layer 3 and the printed ink layer 4 can be reliably released (separated) from the base 2, so as to be thermally transferred on the surface of the molded part 11 as the transferred object, reliably and easily.

As a result, the molded part 11 as the transferred object can be easily high-efficient because of an improvement in transferring property when the printed ink layer 4 being thermally transferred on the molded part 11. That is, the printed ink layer 4 as the image to be transferred on the transferred object can be easily high-efficient because of improvements in shape followingness and graphical design.

Also, with the in-mold transfer film 1 of this embodiment, since the printed ink layer 4 at least partially has the multilayer configuration, and the adhesive force at the interface between every two adjacent printed ink layers 4 at the multilayer configuration is greater than F1, the release can be easily and reliably performed at the interface between the base 2 and the mold-release layer 3 by in-mold decorating even in a case where various types of printing, such as full-color printing, and multi-color printing, are performed on the surface of the molded part 11 as the transferred object.

Also, with the in-mold transfer film 1 of this embodiment, since F1 ranges from about 0.02 to about 0.3 (mN/cm), the release at the interface between the base 2 and the mold-release layer 3 can be further reliably performed by in-mold decorating.

Further, with the in-mold transfer film 1 of this embodiment, since the glass transition temperatures of the mold-release layer 3 and the printed ink layer 4 range from about 50° C. to about 150° C., the release at the interface between the base 2 and the mold-release layer 3 can be further reliably performed by in-mold decorating.

The details of the adhesive force F1 between the base 2 and the mold-release layer 3 in the in-mold transfer film 1 are described below.

The adhesive force F1 between the base 2 and the mold-release layer 3 in the in-mold transfer film 1 is determined by an adherence between the mold-release layer 3 and the base 2. The inventors of the present invention prepared seven samples as the mold-release layers 3 by using three materials of toluene/methyl ethyl ketone=50/50 (mass ratio), polyester resin with a glass transition temperature ranging from 70° C. to 80° C., and acrylic resin with a glass transition temperature ranging from 50° C. to 70° C.; preparing various types of mixed solutions with different mass ratios of the above-mentioned three materials; coating polyester films with these solutions by using a bar-coater; and making the seven kinds of samples with different F1 values, such as 0.01, 0.02, 0.10, 0.2, 0.3, 0.4, and 0.5 mN/cm. The F1 values of the samples were measured by using HEIDON Type-14DR.

A common image (printed ink layer 4) was formed on each of the samples by using a thermal transfer printer, then in-mold decorating was performed using In-mold transfer foil feeding device manufactured by Navitas Inmolding Solutions Co., Ltd. The transfer state was visually evaluated whether the image to be transferred on the molded part 11 is deformed, whether a transfer defect occurs, and whether a flash is generated. The in-mold decorating conditions were mold temperature=80° C., injection temperature=260° C., injection pressure=120 MPa, and injection speed=35 mm/sec. The material of the molded part 11 was acrylic resin.

The sample with the F1 value of 0.01 mN/cm caused powder fall in which the printed ink layer 4 partially fell from the base 2, and thus this sample could not be used as the in-mold transfer film.

The four samples with the F1 values of 0.02, 0.1, 0.2, and 0.3 mN/cm caused no deformation in images, no flash, and no transfer defect, and thus these samples could exhibit good transferring properties.

The sample with the F1 value of 0.4 mN/cm caused a deformation in an image, a flash, and a transfer defect, and thus the sample could not exhibit a good transferring property.

Therefore, by determining F1 as the value ranging from 0.02 to 0.3 mN/cm, the separation (release) can be reliably performed at the interface between the base 2 and the mold-release layer 3. As a result, the printed ink layer 4 as an image can be reliably and easily transferred on the molded part 11 by in-mold decorating without deformation of the image, a flash, or a transfer defect. That is, the image to be transferred on the transferred object can be easily high-efficient because of improvements in shape followingness and graphical design.

It should be noted that the present invention is not limited to the above-described embodiments, and various modifications can be made as desired.

What is claimed is:

1. An in-mold transfer film comprising:
   a film base;
   a mold-release layer provided on a surface of the base; and
   a printed ink layer provided on a surface of the mold-release layer by thermally transferring ink using a thermal transfer printer,
   wherein, in in-mold decorating, a molded part as a transferred object is formed, and at the same time, the printed ink layer is printed directly on a surface of the molded part, and
   wherein the following conditions are satisfied,
   F2>F1,
   F3>F2,
   F3>F1, and
   F3>F1+F4+F5
   where F1 is an adhesive force at an interface between the base and the mold-release layer,
   F2 is an adhesive force at an interface between the mold-release layer and the printed ink layer,
   F3 is an adhesive force at an interface between the printed ink layer and the transferred object,
   F4 is a cohesive force of the mold-release layer, and
   F5 is a cohesive force of the printed ink layer.

2. The in-mold transfer film according to claim 1, wherein the printed ink layer at least partially contains a multilayer portion, and an adhesive force at an interface between every two adjacent printed ink layers is greater than F1.

3. The in-mold transfer film according to claim 1, wherein F1 ranges from about 0.02 to about 0.3 (mN/cm).

4. The in-mold transfer film according to claim 1, wherein the mold-release layer and the printed ink layer have glass transition temperatures ranging from about 50° C. to about 150° C.

* * * * *